Figure 1:
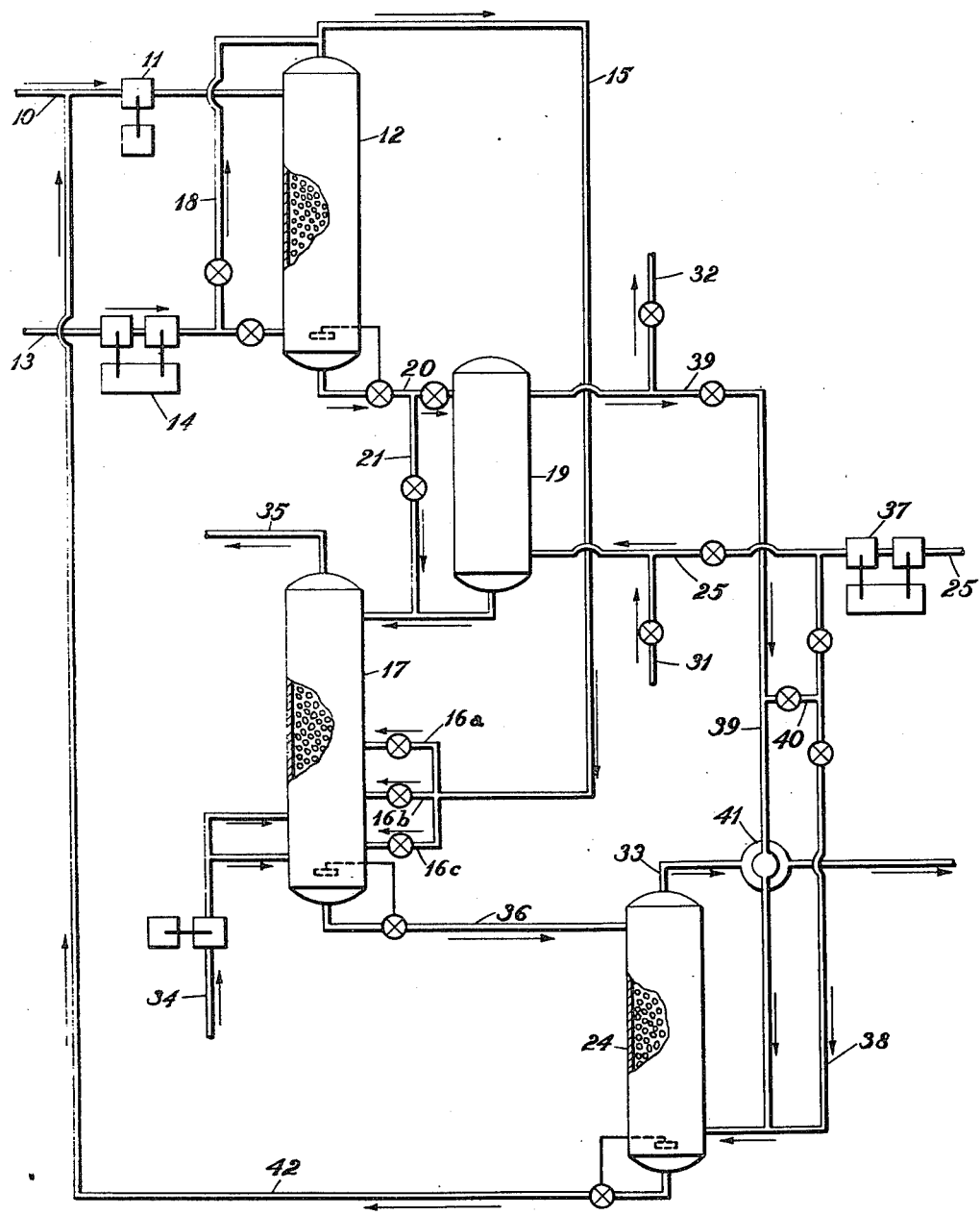

Celeste M. Fontana
INVENTOR

Celeste M. Fontana
INVENTOR

Patented Aug. 17, 1948

2,447,323

UNITED STATES PATENT OFFICE 2,447,323

OXYGEN ABSORBENT MEDIA

Celeste M. Fontana, Dallas, Tex., assignor, by mesne assignments, to Socony-Vacuum Oil Company, Incorporated, New York, N. Y., a corporation of New York Application August 7, 1944, Serial No. 548,349

1 Claim. (Cl. 252—189)

This invention relates to a method of extracting oxygen from the air by the use of molten salts comprising the chlorides of copper in admixture with alkali metal halides, especially alkali metal chlorides such as postassium chloride. More particularly the invention is concerned with the preparation of melt mixtures of copper chlorides and potassium chloride in concentrations so adjusted that the melting points of such mixtures are sufficiently low that oxygen may be absorbed from the air by the liquid melts as hereinafter described and as described in greater detail in U. S. Patent 2,418,402. The invention is also concerned with the preparation of such melts for utilization in the process of making chlorine and chlorinated hydrocarbons as described and claimed in U. S. Patents 2,407,828, 2,418,930 and 2,418,931.

The present invention concerns the optimum concentrations of the chlorides of copper and of potassium chloride in said melts to obtain high rates of oxygen absorption from the air, and also to produce melts which are liquid at temperatures of operation of the various steps of the processes, thereby making possible continuous cyclic operation.

Numerous methods have been proposed in the prior art for the preparation of oxygen from air. These methods may be classified as those involving physical methods of separation such as liquefaction followed by fractionation of the liquid air and those involving chemical methods such as absorption and desorption of oxygen by chemical oxidation and reduction of solids such as oxides of polyvalent metals, the higher oxides of which are reducible by heating at moderately high temperatures. One of the earliest commercial methods of the latter class involved the absorption of oxygen by the lower oxides of barium or manganese to form the higher oxides of these metals which were then desorbed of oxygen either at elevated temperature or reduced pressure. These methods proved cumbersome in practice and in the case of barium oxide (Brin's process) required relatively pure air with respect to carbon dioxide content. Hence liquefaction methods were later adopted. However, liquefaction methods are intrinsically expensive involving costly high pressure refrigeration equipment. The present invention relates to a chemical method adaptable for continuous production of oxygen from ordinary air by employing melts of copper chlorides with alkali metal chlorides in such proportions as to give liquid media for maximum rate of oxygen absorption.

The most widely used method for producing chlorine is the electrolytic method. Other methods involve the recovery of chlorine from hydrogen chloride. The prior art employed in general, two methods for converting hydrogen chloride to chlorine. The first method involves direct catalytic oxidation of hydrogen chloride to chlorine. Common among the catalysts employed have been copper halides supported on porous materials such as pumice. Promoted copper catalysts having some other substance added to improve their catalytic activity have also been proposed. Addition agents suggested as effective are oxygen compounds of vanadium, beryllium, magnesium, bismuth, antimony, uranium and rare earth metal compounds. These catalytic processes all suffer from the same disadvantage, viz., the products from the catalytic converters require difficult and expensive treatment in order that quantitative yields of pure chlorine be obtained.

The second method proposed in the prior art for the production of chlorine is a cyclic two-stage process, involving in the first stage, absorption of the hydrogen chloride in a metal oxide, whereby the metal oxide is converted to the chloride, and, in the second stage, the reconversion of the metal chloride to the oxide and chlorine by means of oxygen at a higher temperature. The "Mond" process is a typical example of such a process in producing only a dilute chlorine containing gas and having the additional disadvantage of the necessity of alternately cooling and heating a stationary mass in the converter over a considerable temperature range while changing over from one stage of the operation to the other, resulting in heat losses and inefficient use of the converter during the heating and cooling operations. As in the case of a more efficient method for producing oxygen, the present invention supplies a medium for oxygen absorption and heat transfer thus making possible a continuous cyclic process for producing chlorine.

A third process to which my invention is an important contribution is that of recovering hydrogen chloride in the form of alkyl halides such as methyl chloride described in detail in the hereinabove mentioned U. S. Patent 2,407,828. Hydrogen halides, such as hydrogen chloride, are liberated in the production of alkyl halide intermediates by halogenation of hydrocarbons and in the conversion of such halides to the final products; hence the commercial feasibility of these processes usually depends upon the economical recovery of the halogen acids and their reconversion to the corresponding halide. Prior art methods have attempted the recovery and reconversion of halogen acids by processes wherein the oxidation of the acid and the chlorination of methane are carried out simultaneously. For example, it has been suggested that methyl chloride be produced by passing a mixture of methane, hydrogen chloride and air, or oxygen, over a supported copper halide catalyst. In the use of methods involving simultaneous oxidation of hydrochloric acid and chlorination of hydrocarbons, particularly methane, the yields of chloromethanes are low and considerable hydrogen chloride passes through the converter unchanged and the chloromethanes are highly diluted with water vapor and air, thus requiring additional and expensive processing to obtain the chloromethanes in purified form.

A primary object of the present invention is to provide melts of copper chloride with alkali metal halides, preferably with potassium chloride, for utilization as absorbent media for oxygen in improved continuous cyclic processes for the production of oxygen, and for the production of chlorine or chlorinated hydrocarbons from hydrogen chloride involving an oxidation step.

A further object of the invention is to provide melts of the chlorides of copper with potassium chloride in such proportions that maximum rates of absorption of oxygen from the air can be obtained at operating temperatures adaptable to improved methods of producing oxygen, chlorine or chlorinated hydrocarbons.

An additional object of this invention is to produce a carrier supported mixture of chlorides of copper and potassium chloride in such proportions of potassium chloride to copper chlorides that the heated mixture of chlorides will show high rates of oxygen absorption.

Still another object of the invention is to produce oxygen absorption melts of copper chlorides with potassium chloride in proportions such that said melts may be readily maintained in the liquid phase in all of the steps and transfer operations in the methods referred to above for producing oxygen, chlorine, or chlorinated hydrocarbons.

Other and further objects of the invention will be apparent from the description thereof and from the appended claims.

Cuprous chloride may be converted to the cupric oxide-cupric chloride complex form by reacting the molten chloride with air according to the following equation:

(1) $2CuCl + \frac{1}{2}O_2 \rightarrow CuO \cdot CuCl_2$

The molten mass containing the complex "oxychloride" may be treated in succeeding steps to make oxygen, or chlorine or to chlorinate hydrocarbons such as methane. If it is desired to make oxygen, the molten mass is heated in a second step to reconvert the same to cuprous chloride and free oxygen according to the equation:

(2) $CuO \cdot CuCl_2 + \Delta H \rightarrow 2CuCl + \frac{1}{2}O_2$

If it is desired to recover hydrogen chloride by reconversion to chlorine, the molten mass containing oxychloride is contacted with the waste gas containing the hydrogen chloride and reaction takes place according to the equations:

(3) $CuO \cdot CuCl_2 + 2HCl \rightarrow 2CuCl_2 + H_2O$ (4) $2CuCl_2 + \Delta H \rightarrow 2CuCl + Cl_2$ If on the other hand it is desirable to utilize the chlorine directly to produce alkyl chlorides such as methyl chloride, this may be accomplished in a separate zone by contacting the neutralized oxychloride molten mass with methane as expressed by the equation:

(5) $CH_4 + 2CuCl_2 \rightarrow CH_3Cl + 2CuCl + HCl$

As described in detail hereinbelow, I have illustrated my process diagrammatically in Figure 1 wherein is shown the application of the copper chloride-potassium chloride melts in a process for converting hydrogen chloride to alkyl chlorides using copper chloride-potassium chloride melts in optimum concentration of potassium chloride, cuprous chloride and cupric chloride. The process incorporates three successive steps wherein the principal reactions occurring in the steps are illustrated by Equation 1, Equation 3 and Equation 5 respectively. The first reaction zone is designated as the preoxidation zone, the next zone is designated the oxidation-neutralization zone and the final zone, the chlorination zone.

Since it is desirable to maintain the melt in a liquid state in the operation of a continuous cyclic process, the choice of composition of the melt to be used is determined (1) by the freezing point of the melt as affected by change of composition relative to proportions of cuprous chloride and cupric chloride in successive steps of the process and by the mole percent of potassium chloride in the melt, (2) by the desired rate of oxidation of the melt, and (3) by the desired rate of chlorination by the melt.

It has been found that potassium chloride as a third component in admixture with cupric and cuprous chlorides produces melts of relatively low freezing points and other suitable properties, and hence is a desirable component in such a mixture for reducing to continuous cyclic operation processes involving the use of these components such as for the production of oxygen, for the oxidation of organic materials, for the production of chlorine and for the chlorination of hydrocarbons. I have found that in addition to producing relatively low freezing point melts of copper chlorides, potassium chloride at optimum concentrations greatly increases the rate of oxidation of cuprous chloride in the melt. I have further found that these optimum concentrations with respect to rate of oxidation correspond very closely to minimum melting compositions of the copper chloride-potassium chloride mixtures.

Potassium chloride occupies a unique position as a third component in regard to freezing point depression of the copper chloride salts. Sodium chloride as a third component does not give a comparable lowering, but a part of the potassium chloride in the melt can be replaced by sodium chloride or other alkali metal chlorides without appreciably altering the extent of the lowering. Thus crude potassium chloride containing appreciable amounts of other alkali metal halides can be used, the effect of such impurities being to further lower the freezing points.

I have found that melts suitable with respect to both freezing point and rate of oxygen absorption contain from 20 to 50 mole percent potassium chloride, the preferred range of potassium chloride content being from 25 to 45 mole percent. The basis for the above preferred limits will become clear in the subsequent discussion and by reference to Figure 2.

Cupric chloride forms a complex of the composition $K_2CuCl_4$ with the potassium chloride of the melt. As a first approximation it can be considered that the melt after it has been used for chlorination or oxidation will be approximately a mixture of flux of cuprous chloride in $K_2CuCl_4$. Such a mixture is to be understood as included in the ternary system cuprous chloride, cupric chloride and potassium chloride. For example, a mixture consisting of 30 mole percent potassium chloride, 15 mole percent cupric chloride and 55 mole percent cuprous chloride is to be considered identical with a mixture consisting of 55 moles cuprous chloride, CuCl and 15 moles of the complex $K_2CuCl_4$ or a mixture containing 78.6 mole percent of cuprous chloride and 21.4 mole percent of the complex $K_2CuCl_4$. The formation of this complex causes a part of the cupric chloride to remain practically inactive for chlorination as shown in Figure 3 where the rate of chlorination of methane in arbitrary units is plotted against percent of the copper in the cupric chloride form for a melt containing 30 mole percent KCl.

Figure 3:
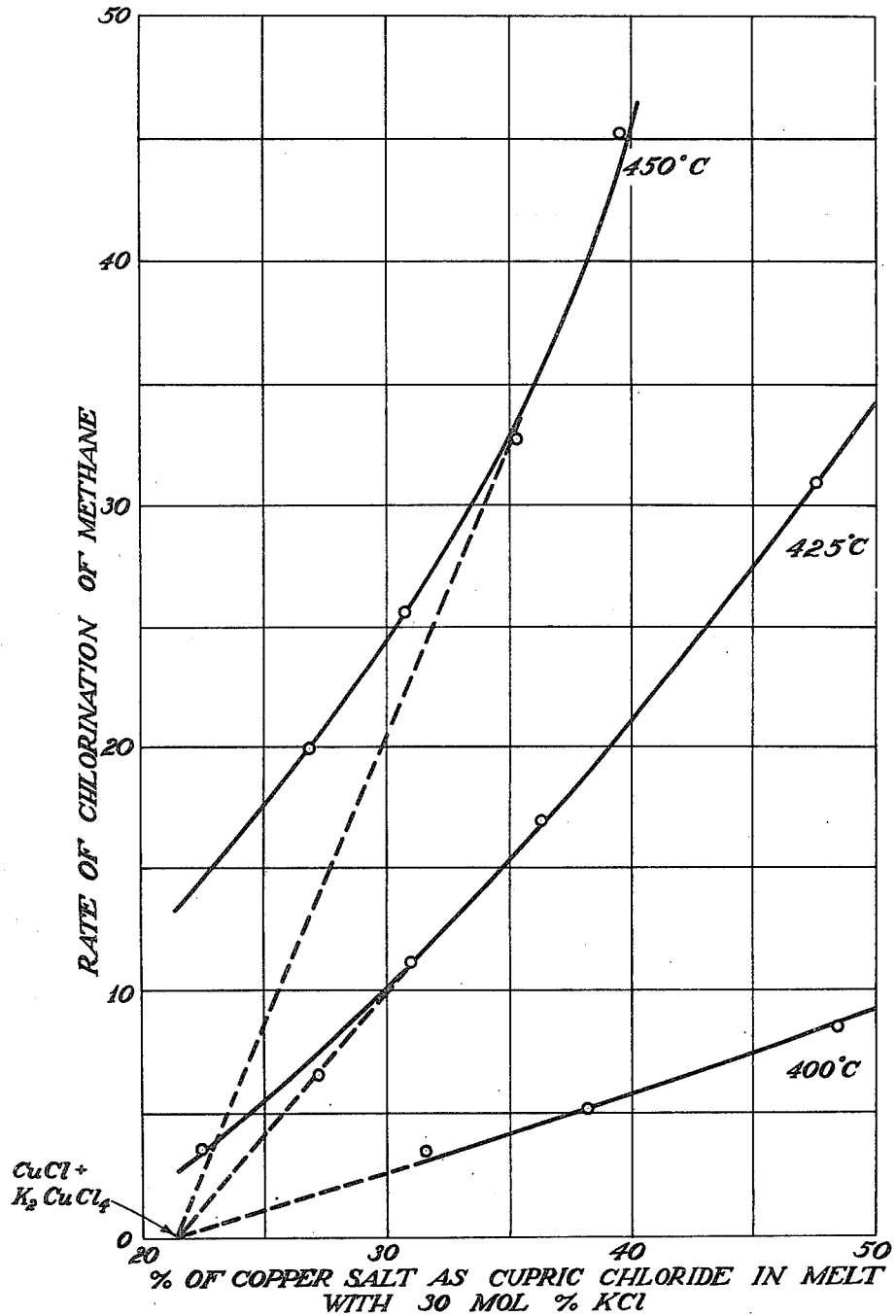

However, it may also be seen from Figure 3 that at higher temperatures the said complex begins to show some activity. For example, the 400° C. chlorination rate curve may be extrapolated approximately as a straight line to zero chlorination rate at the point where 21.4 mole percent of the copper salt is cupric chloride which represents the cupric chloride "tied up" as inactive complex, $K_2CuCl_4$. On the other hand the chlorination rate curves at higher temperature deviate from a linear relation in the neighborhood of 21.4 percent cupric chloride, the deviation being greater the higher the temperature. This shows that the complex $K_2CuCl_4$ becomes more active at higher temperatures as a result of partial thermal decomposition into free cupric chloride and free potassium chloride. Therefore, I do not wish to be restricted to operation in the range of percent cupric chloride in excess of that required to form the complex $K_2CuCl_4$.

Figure 2:
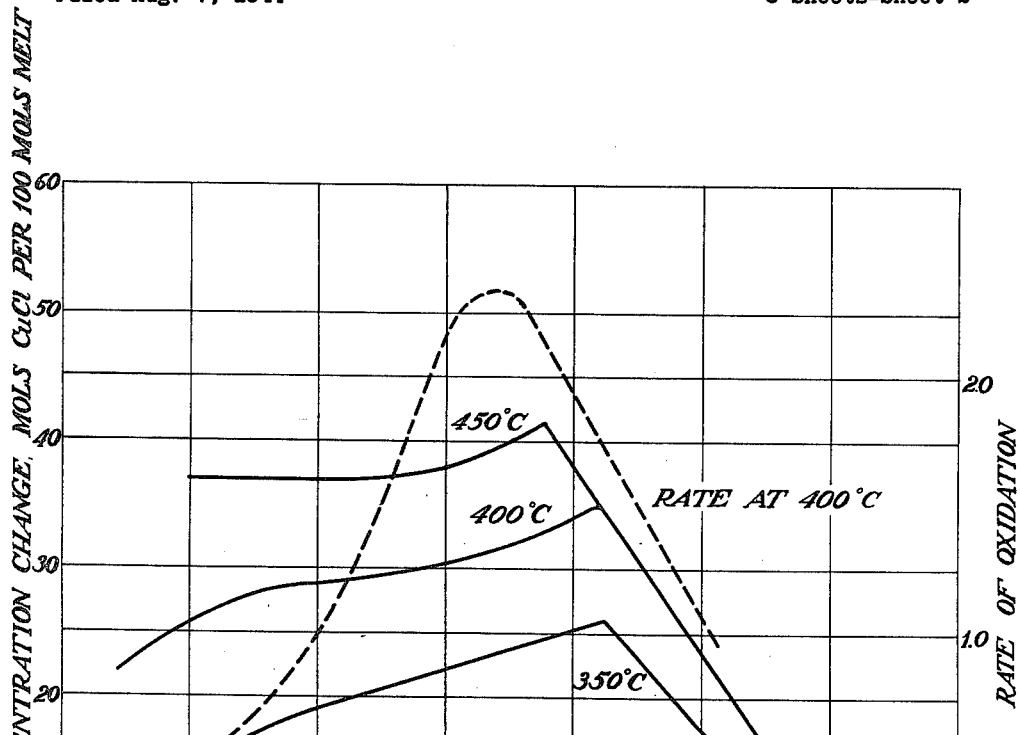

In view of the approximate limitation of activity of cupric chloride by the formation of the complex $K_2CuCl_4$, I have determined rates of absorption of oxygen as a function of mole percent of potassium chloride along a line corresponding to mixtures of potassium chloride with $K_2CuCl_4$. The results are shown in Figure 2 wherein the rate of oxidation at 400° C., expressed in arbitrary units, is plotted against mole percent of potassium chloride in the melt. From the curves in Figure 2 it is clear that a maximum rate exists. Also in Figure 2, are plotted the allowable ranges of cuprous chloride change as a function of mole percent potassium chloride at various temperatures, the range at any point being limited on the one hand by the freezing point of the melt and on the other by the inactivity of $K_2CuCl_4$, which as pointed out before becomes somewhat active at the higher temperatures. It is seen that for temperatures between 300° C. and 450° C. a maximum change in cuprous chloride content is possible for melts containing from 25 to 45 mole percent potassium chloride. It may thus be seen that the preferred potassium chloride content with respect to both rate of oxygen absorption and freezing point is from about 25 to 45 mole percent with the outer limits from about 20 to about 50 mole percent potassium chloride.

In making up my copper chloride-potassium chloride melt, I may introduce fresh melt having a composition approximately 30 to 35 mole percent potassium chloride, and 70 to 65 mole percent chlorides of copper of which approximately 15 mole percent consists of cupric chloride and 50 to 55 mole percent cuprous chloride. Such a melt will be in liquid form at temperatures above about 250° C. and the mixture will remain in liquid form even though in the oxidation-neutralization step, the relative concentration of cupric chloride to cuprous chloride may change from an initial ratio of 15:55 to a ratio as high as 50:20 since the temperature of the melt mixture increases, as a result of the exothermic character of the oxidation reaction, to 450° C. or even 500° C. in that part of the reactor where these higher concentrations of cupric chloride predominate. The freezing point of a melt having a composition of 50 mole percent cupric chloride, 20 mole percent cuprous chloride and 30 mole percent potassium chloride is about 430° C.

The above ratios of cupric chloride to cuprous chloride should not be interpreted as limitations on the melt composition. In fact, the only necessary specification for making up the melt for the chlorination processes is on the ratio of potassium chloride to copper chlorides, since the ratio of cupric chloride to cuprous chloride in the melt changes in use. For example, in the process described below, regardless of whether the starting melt contains substantially all of the copper chloride in the cupric form or substantially all of the copper chloride in the cuprous form, the range of ratios of cupric chloride to cuprous chloride present in the melt for on stream operation will assume the same values, which values will depend somewhat on the operating conditions. These values of mole ratios of cupric chloride to cuprous chloride for continuous on stream operation will lie within the range of from about 1:10 to about 10:1.

I do not wish to be restricted to the circulation of the liquid molten salt mixtures per se since the preferred compositions may be absorbed or impregnated on suitable inert porous supporting materials and circulated by any of the well known "fluid" techniques. Such materials as alumina, alumina gels, silica gels, alumina-silica gels, fuller's earth, infusorial earth, pumice, kieselguhr, etc., may be employed. These carrier materials may be impregnated with the salt mixtures by any of the well known methods but preferably by absorption of the salts from a concentrated aqueous solution, for example, a concentrated solution of cupric chloride and an alkali metal chloride such as potassium chloride containing the preferred ratio 20 to 50 moles of alkali metal chloride to 100 moles total of the two salts. Where the chlorides are supported on inert carriers freezing point considerations are not controlling and hence, any alkali metal chloride may be used to modify the rate of reaction.

The material after filtration and drying may be crushed. If the impregnated carrier is to be suspended in a gas such as in air for the production of oxygen as described and claimed in co-pending application, Serial No. 548,350, filed August 7, 1944, by Edwin Gorin and applicant, the particle size of the crushed impregnated carrier so used will be within the range of 10 mesh and 10 micron size, preferably within the range of 30 mesh and 50 micron material. The impregnated carrier may be used for chlorination or if it is to be used for oxygen absorption as described above, the cupric chloride content is first partially reduced to cuprous chloride, for example, by contacting with a hydrocarbon at temperatures within the range of 400° C. to 500° C. By this procedure the above described melt is formed in situ. The total amount of chloride impregnated on the carrier by the above method will be within the range of from about 20% to 65% by weight of the impregnated product, preferably from about 30% to about 50% by weight. The amount of mixed chlorides on the support should not be too high to retain the free flowing characteristics of the impregnated powdered solid at temperatures above the melting point of the supported mixture of chlorides.

In order to illustrate specifically the manner in which my novel salt composition may be prepared for use as a carrier impregnated reactant, 0.70 mol of cupric chloride and 0.30 mole of potassium chloride were dissolved in water to form 250 cubic centimeters of solution. The solution was added to finely pulverized infusorial earth to form a slurry. The material was filtered and the solid was dried at 150° C. and pulverized. The anhydrous powder contained 23.6 weight percent of cupric chloride salt and 5.6 weight percent of potassium chloride. The impregnated powder was heated to 500° C. without agglomeration and was shown to react in a manner analogous to a 30 mole percent potassium chloride melt except for a greatly accelerated rate of reaction due to the extent of exposed surface. The cupric chloride was partially reduced in situ by contacting the mass with methane at about 410° C. and the resulting powder was found to absorb oxygen rapidly from a stream of air in a temperature range from 300° C. to 450° C. After contacting the oxide containing powder with hydrogen chloride the powder was used to chlorinate methane in the temperature range from 350° C. to 525° C. The rate of chlorination was rapid at temperatures above about 375° C.

In order to illustrate the manner in which the improved copper chloride oxygen absorbent melts may be used, the following description of an adiabatic process for the chlorination of methane is given in connection with Figure 1.

Referring to Figure 1, a molten mixture consisting of about 30 mole percent potassium chloride, 55 mole percent of cuprous chloride and 15 mole percent cupric chloride is introduced at a temperature within the range of from about 350° C. to about 400° C. through line 10 and pump 11 to packed preoxidizer tower 12 where it is contacted with air introduced to tower 12 by means of compressor 14 in line 13. I prefer to operate the preoxidation tower at pressures above atmospheric, pressures as high as 25 or 35 atmospheres being suitable for this operation.

The function of the preoxidation step is to produce a part of the unstable oxychloride, CuO·CuCl₂ in a zone ahead of the oxidation-neutralization step in order to supply an absorbent for any hydrogen chloride present near the top of the oxidation-neutralization tower described below. Fresh cuprous chloride melt or recycle cuprous chloride melt containing either free cupric chloride or the complex K₂CuCl₄ coming in contact with water vapor in the effluent gas from the oxidation-neutralization tower 17 hydrolyzes to a certain extent to form HCl. Hence, recycle cuprous chloride is first partly converted to the oxychloride in the preoxidation tower before entering tower 17. An additional function of the preoxidizer is to heat up the main air stream passing as overhead from preoxidizer 12 through lines 15 and valved lines 16a, 16b and 16c to the oxidizer-neutralizer 17. By the proper adjustment of the valves in line 13 and by-pass line 18, I may by-pass the preoxidizer 12 with a part of the necessary air, and thereby control the degree of oxidation in preoxidizer 12 and also to some extent control the temperature of the air entering tower 17. I prefer to oxidize the melt in tower 12 to approximately the solubility of the oxychloride and copper oxide in the melt. This amounts to 1 to 8 mole percent of the total copper salt or approximately 3 to 30% of the total conversion of cuprous chloride to cupric chloride per pass through the oxidation zones.

The oxygen enriched melt becomes cooled somewhat as it passes through tower 12 due to contact with cold air and limited extent of oxidation therein, and hence cooler 19 may not be necessary for cooling the melt as it leaves tower 12 through line 20 in which case the valve in by-pass line 21 is opened and the valve in line 20 is closed whereby melt is sent directly to the oxidizer-neutralizer tower 17. In case cooler 19 is used, the hot melt may be heat exchanged with hydrocarbon feed to chlorinator 24 introduced to cooler 19 through line 25, thereby conserving heat of oxidation for use in the chlorination step. If, on the other hand, it is desirable to remove heat from the system, cooling fluid may be introduced to cooler 19 via lines 31 and 25 and removed from cooler 19 via lines 39 and 32.

In packed tower 17 the heated melt is contacted with heated air leaving tower 12 through line 15 and introduced to tower 17 at a multiplicity of points through valved lines 16a, 16b and 16c. Hydrogen chloride in amounts of about four moles per mole of total oxygen absorbed by the melt, in the form of hydrochloric acid of at least 20% concentration but preferably more concentrated, in a hydrogen chloride equivalent quantity, is introduced at a multiplicity of points near the bottom of tower 17 through line 34 provided with a conventional compressor. The mixture of rising air and hydrogen chloride react with the descending melt to produce at the tower exit a melt of maximum cupric chloride content.

As stated above, the melt issuing from the preoxidizer 12 is saturated with respect to oxide content of the melt which progressively diminishes in passing down through tower 17 as increased concentration of hydrogen chloride is encountered by the melt. The oxide content is finally diminished to a very low value at the bottom of reaction tower 17 in the zone of highest hydrogen chloride concentration. This condition prevents contamination of the chlorinated product with water vapor formed by neutralization. The water vapor is eliminated from tower 17 along with the oxygen depleted air through line 35. The temperature of the melt in tower 17 ranges from a maximum of 375° C. at the top of the tower to a range of 425° C. to 525° C. as the melt leaves the tower through line 36 leading to the top of chlorination tower 24. If desired, the melt may be heated by any suitable means, as by a furnace (not shown), after leaving tower 17 via line 36, before introduction to chlorination tower 24. Loss of HCl in the overhead via line 35 from tower 17 is minimized by preconversion of cuprous chloride in the melt in tower 12 to the oxychloride which absorbs any excess hydrogen chloride reaching the top of tower 17. If desired, the traces of HCl and volatilized melt loss through line 35 may be recovered by condensing a small fraction, for example, 2 or 3 percent of the steam in the effluent stream by means of a chilled packed tower (not shown), the condensate being returned through the HCl feed line 34. This effluent stream may also be used for preheating the methane feed to tower 24 or as a source of additional heat or power. The operation in tower 17 is preferably carried out at pressures in excess of atmospheric, though preferably at somewhat lower than the operating pressure of preoxidation tower 12.

In packed tower 24 the melt, rich in cupric chloride, contacts countercurrently methane vapors introduced at the bottom of the tower via line 25, compressor 37 and valved line 38 and is thereby converted to a cuprous chloride rich melt with simultaneous formation of a mixture of chloromethanes, predominantly methyl chloride. By proper adjustment of the valves in lines 38, 39, 40, 31 and 32 the methane feed to chlorination tower 24 may be used as a cooling means for preoxidized melt in cooler 19, or the methane may be used as cooling means for overhead product from tower 24 in exchanger 41. The temperature of the melt in chlorination tower 24 will vary from a range of 425° C. to 525° C. at the top of the tower to 375° C. to 425° C. at the exit from the tower in line 42 depending on the extent of preheating of the methane feed. The pressure maintained in tower 24 is usually somewhat less than the pressure in tower 17. Superatmospheric pressures are preferred although tower 24 may be operated at atmospheric pressure. The products of the reaction of the hydrocarbon with the cupric chloride melt in tower 24 are chiefly the chlorohydrocarbons such as chloromethanes and hydrogen chloride a mixture of which products is taken overhead via line 33 to a fractionation system for further processing. In tower 24 the melt is converted from a high content of cupric-low content cuprous chloride melt to a low cupric chloride-high cuprous chloride melt which is recycled to preoxidation tower 12 via lines 42 and 10 and pump 11. I prefer to maintain a liquid level of melt in towers 12, 17 and 24 which I accomplish by means of float control valves in lines 20, 36 and 42.

While I have described an essentially adiabatic process for making chlorinated hydrocarbons utilizing my copper chloride-potassium chloride melts in a manner to obtain improved oxidation rates and hence, reduced size of oxygen absorber, I do not wish to be limited to such use of the melts since they can be used with equal advantage in an analogous process for the production of free chlorine, for the production of free oxygen, or for the oxidation of organic materials or in any process in which a liquid or carrier adsorbed melt is used to absorb oxygen.

The foregoing description has been made rather detailed for clearness of understanding only, and no unnecessary limitations should be understood therefrom, but the appended claim should be construed as broadly as permissible in view of the prior art.

I claim:

A composition of matter consisting essentially of a melt of potassium chloride, cuprous chloride and cupric chloride said potassium chloride being present in amounts within the range of from about 25 mole percent to about 45 mole percent, said cuprous chloride being present in amounts within the range of from about 5 mole percent to about 65 mole percent and said cupric chloride being present in amounts within the range of from about 10 mole percent to about 60 mole percent.

CELESTE M. FONTANA.

REFERENCES CITED

The following references are of record in the file of this patent:

UNITED STATES PATENTS

| Number | Name | Date |
| --- | --- | --- |
| 2,206,399 | Grosvenor | July 2, 1940 |
| 2,280,673 | Thomas | Apr. 21, 1942 |

FOREIGN PATENTS

| Number | Country | Date |
| --- | --- | --- |
| 3,171 | Great Britain | 1866 |
| 214,293 | Great Britain | Apr. 14, 1924 |
| 197,955 | Germany | June 3, 1906 |

OTHER REFERENCES

"Sulfuric Acid and Alkali," Lunge, volume III, Gurney and Jackson, London, 1911, pages 438–442, 451, 489.